Figure 1:
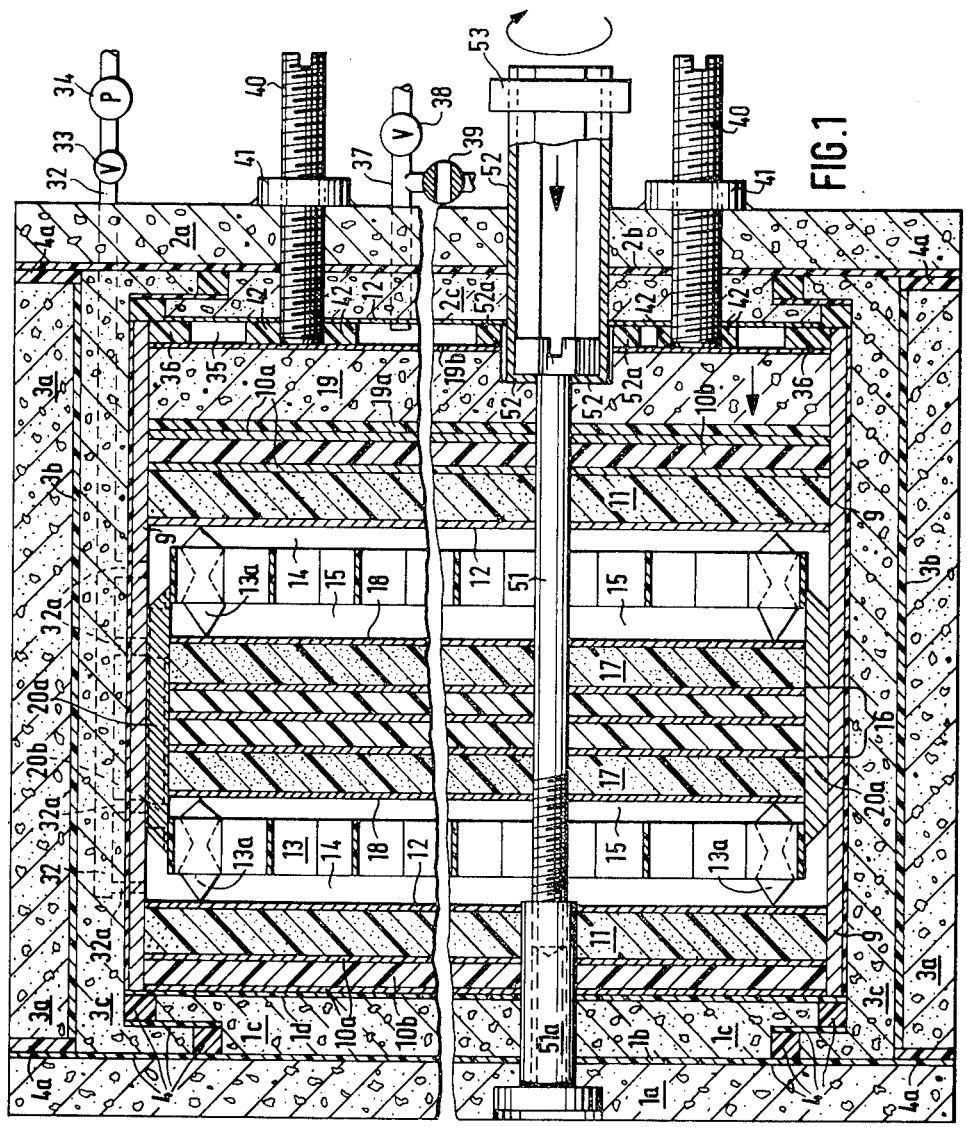

United States Patent [19]

Becker

[11] 4,055,920
[45] Nov. 1, 1977

[54] LOAD BEARING CONSTRUCTION UNIT

[76] Inventor: Otto Alfred Becker, Robert Koch Strasse 59, 66 Saarbrucken 6, Germany

[21] Appl. No.: 645,651

[22] Filed: Dec. 31, 1975

[30] Foreign Application Priority Data

Dec. 31, 1974 Germany .............................. 2461940

[51] Int. Cl.$^2$ ............................................. E04C 3/26
[52] U.S. Cl. ..................................... 52/2; 52/223 R; 52/615
[58] Field of Search ...................... 52/615, 223, 2, 616

[56] References Cited
U.S. PATENT DOCUMENTS

| 1,895,667 | 3/1929 | Junkers | 52/223 |
| 2,742,115 | 4/1956 | Strong | 52/615 |
| 2,799,059 | 7/1957 | Stack | 52/615 |
| 2,918,023 | 12/1959 | Bettcher | 52/615 |
| 3,011,254 | 12/1961 | Melill | 52/615 |
| 3,140,516 | 7/1964 | Stack | 52/615 |
| 3,149,742 | 9/1964 | Hay | 52/615 |
| 3,161,265 | 12/1964 | Matsch | 52/615 |
| 3,803,784 | 4/1974 | Becker | 52/615 |
| 3,811,239 | 5/1974 | Becker | 52/615 |
| 3,936,553 | 2/1976 | Rowe | 52/615 |

Primary Examiner—Ernest R. Purser
Assistant Examiner—Henry Raduazo
Attorney, Agent, or Firm—Erich M. H. Radde

[57] ABSTRACT

A loadbearing construction element consisting of outer shells which define an air-tight cavity in which is supported insulating elements which form collectively an inner unit. Means are provided for evacuating the cavities of the inner unit and for subsequently pressurizing the components of the inner unit to form a composite core the components of which are fixedly connected to each other. Pressure against the components of the inner unit can be increased by adjustable screws extending through the outer shell into contact with a pressure plate forming part of the inner unit. In this manner, stresses in the element are created so that the outer shells and the components of the inner unit are reinforced and rendered resistant to bending.

17 Claims, 3 Drawing Figures

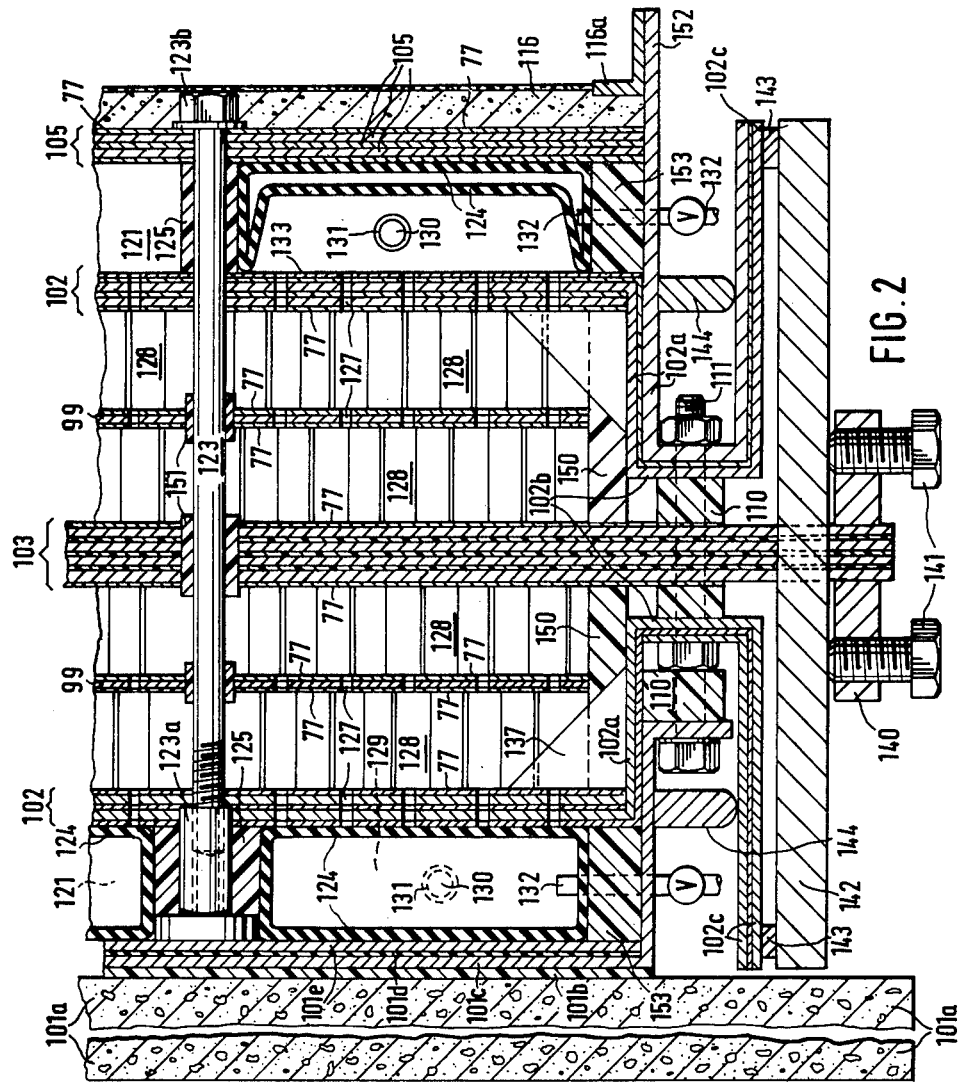

LOAD BEARING CONSTRUCTION UNIT

Construction unit, in particular loadbearing construction unit, for example for buildings, columns, bridges, vehicles.

The subject of the invention described below is a construction unit made from materials suitable for the particular use, more especially a loadbearing construction unit. It may be used in particular in the following fields:

Buildings and civil engineering, vault construction, dome construction, tunnel construction, underground installations, submarine constructions, construction of columns, piles, beams, frames, masts, chimneys, load-bearing pipes, pressure pipes, bridge construction, vehicle construction, e.g. land vehicles, marine vehicles, aircraft, space vehicles, container construction, load-bearing foundation constructions, shoring structures, retaining weir, wavebreakers and the like. This enumeration is of course not complete.

The construction unit consists of two or more shells of any specifically suitable materials, in particular shells made in composite form whose constituents consists of various specifically suitable materials, preferably partially of metal and plastic in conjunction with porous materials in sandwich form or multiple composite form, at least one seal disposed between the shell edges and a cavity which is enclosed in air-tight manner by said seal and in which are provided preferably insulating pressure means, support means, reinforcing means (e.g. honeycomb plates) with interposed fixed plates (e.g. metal plates) and associated sealing plates (e.g. plastics foam plates) which may be coated with vapour-proof foils (e.g. aluminium foils) and at least one of the shells in disposed moveably with variable position or flexibly (e.g. concavely) at the seal and a vacuum or reduced pressure is produced at least in one cavity.

Because of the absence of air counterpressure in the interior of the unit the external air pressure produces at least a bending of the flexible shells or of partial areas thereof and/or in particular a change in location of the shells towards each other by pressing the seal and cavity inserts together by means of screws. Due to this screw pressure and the atmospheric pressure the inserts in the cavity, in particular the honeycomb webs, are subject to stress and press with this force against the interposed metal plates and the insides of the shells. This produces an increased bending strength of the inner plates supported in this manner and the intermediate shells, as well as the outer shells when loaded in the direction of their planes. In the case of a vacuum this force exerted by the outer shells and the honeycomb plates on the surfaces of the metal plates disposed in the cavity and other interposed plates is about 10 t per m$^2$.

This atmospheric pressure is a quantity which depends on chance. It depends on the force of attraction of the earth on the air envelope, the composition of the air as mixed gas and the height of the atmosphere.

The problem underlying the present invention is to improve the various parts and arrangements which give the construction unit its loadbearing capacity.

In particular, the loadbearing capacity of the unit according to the invention is determined by the state of stress into which the honeycomb webs or similar means are put by the other means acting thereon. Such means may be provided in the interior of the unit or alternatively act from the outside on the various layers of the unit. In the interior of the unit a reduced pressure or vacuum may obtain in the individual cavities, chambers, honeycombs or cells and the atmospheric outer pressure acting on the outer shells of the unit thereby caused to produce its effect, i.e. generate a stress in the cavity webs, in particular honeycomb webs, directed vertically with respect to the shell surfaces.

Likewise, an excess pressure may be produced within the unit, either by means of air or other gas or by a liquid or solid materials or pasty materials which solidfy to solid materials, and tends to force the unit apart. If this tendency is taken up by counter forces, e.g. by clamp or stress screws or clamp bands placed round the unit or compositions, e.g. concrete, cast round the unit and taking up the pressure, the internal excess pressure subjects the honeycomb webs or the like to stresses. However, these stresses act via the webs only on the bridge-like contact points of the shell directly linearly contacted by the webs. The stress force is concentrated substantially in the ratio of said contact areas of the webs to the total area of the contacted shell. For this purpose the honeycomb webs or the like stressed means must be given a correspondingly high flexural strength. This may be done by the thickness of the particular material or by a combination of various components which are fixedly joined togehter to form a unit as honeycomb webs for example by adhesion or welding.

According to the invention stress screws which preferably extend through the entire unit are to engage in particular at the points of the construction surfaces which are especially suitable for ensuring the concave bending. Provided according to the invention in association with said stress screws are pressure screws which pass through the shells, which are provided with nut-like threads at the respective points, and press moveable shells in particular of an inner unit against the support and insulating elements disposed in the interior of the unit. The counterpressure thus resulting tends to bend the shells convexly outwardly and is taken up by the aforementioned stress screws and the latter, in spite of the counterpressure, ensure at least a slightly concave bending of the shells. According to the invention the stress screws may be made in special manner and perform both the pressing together of the support and insulating elements of the inner unit as well as, independently thereof, concavely stress the two outer shells of the outer unit with respect to each other.

According to a further example of embodiment a spreading apart of the edge portions produced by the shell edges due to the concave bending of the shell tensions an intermediate shell and this limits the further bending of the outer shells which define the evacuated cavity, establishing equilibrium of forces. A high pre-stressing may be imparted to said intermediate shell by a lever-like arrangement as regards the shell angled portions in conjunction with stress screws and the horizontally acting buckling component reduced to a minimum.

The two examples of embodiment further show arrangements which permit evacuation of the units or pressurizing thereof. Hereinafter two examples of embodiment are described in detail. FIGS. 1 and 2 show the units in vertical section.

FIG. 1 shows a composite constructin unit consisting of an outer and an inner construction unit. The outer unit consists of two opposing plates or shells 1 and 2. The outer shells are composite shells. Each consists in the example of FIG. 1 of an outer shell portion 1a or 2a and an inner shell portion 1c or 2c. These two shell portions advantageously consist of different materials having properties specifically adapted to their purposes.

Thus, for example, the shell member 1a may be a reinforced concrete plate which is joined in sandwich manner via an intermediate layer 1b (core) for example a plastic layer or an adhesive layer of a layer which is formed by an adhered foil which is vapour proof or via an aluminium foil or aluminium sheet metal layer or via a sound-absorbing layer, e.g. a copolymer film, to the shell member 1c. Advantageously the intermediate layer 1b is elastic to permit expansions and stresses to be taken up.

In contrast, the inner shell 1c has, apart from adequate compressive strength, high sound, heat and moisture-insulating properties. Modern building materials combined with plastics have such properties. They may be combined in sandwich manner with the plate 1a.

Whereas the outer shell member 1a is a continuous plate with the full height of the unit, the inner plate 1c (as apparent from the drawings) has substantially only the height of the cavity formed by the two shells 1 and 2 together with a border 3. The plate 1c is provided at its edge portions towards the plate 1a with recesses (grooves) into which the border 3 or its portion 3c may engage with an angled portion.

Between the plate 1c and the plate 1 and the engaging portions of the border 3 or of the border portion 3c seals 4 are disposed by means of which the border 3 establishes a gas-type joint with its engaging portion 3c. Between the outer border portion 3a and the outer plate portion 1a a seal 4a may be additionally provided and is of particular elasticity so that it can compensate stresses in other directions as well.

Such resilient intermediate layers 4 and additional resilient seals 4a also prevent flank sound transmissions. They may be dimensioned and arranged to meet their purpose.

The opposite shell 2 is also made in composite manner. It consists of the outer shell member 2a and the inner shell member 2c which are bonded together in sandwich form via an intermediate core layer 2b. This composite shell 2 generally functions different to the shell 1. For example, it may define an inner space of a building. In this case, it may or may not be loadbearing. If it is load bearing it may be made substantially like the shell 1a. Whereas the shell 1a as a loadbearing facade shell may be provided with external plaster, in this case the interior room shell member 2a may be provided with gypsum plaster. This gypsum plaster may cover the various devices used in the production of the unit, as described later. For this purpose, the outwardly projecting parts of these devices (in contrast to the drawing) may be inserted in recesses of the shell member 2a. Also, parts such as the evacuating tube 32 described later may be arranged covered above a suspended ceiling.

The composite shell 2 is also intended as fire protection. For this purpose it is to be made from refractory materials.

The inner sheel member 2c is intended to perform to a greater extend the functions of the inner shell member 1c. As already mentioned, the encircling border 3a, 3c consists of parts which together with an intermediate layer 3b form a unit in composite manner. This bonding layer 3b is preferably resilient and also vapour proof. It is also intended to provide sound and heat insulation and compensate stress. The outer layer 3a may be of greater flexural and compressive strength than the inner layer 3c. Suitable materials are synthetic rubbers of various elasticity and hardness. The outer border layer 3a may for example be a silicone rubber layer and the inner border layer 3c made of softer rubber of higher elasticity. Alternatively, the border may be effected in that the horizontal upper and lower border portions are made differently, corresponding to the compressive load, to the perpendicular lateral border portions. All these portions are however resiliently connected together in gas-tight manner. This construction of the outer unit provides a cavity which is completely gastight and has a compressive and flexural strength of predetermined magnitude. The cavity between the shells 1 and 2 and the border 3 serves to accommodate the inner unit.

Arranged perpendicularly within the cavity are support and insulating elements. Some of these elements comprise cells or chambers. For example, from the left to the right of FIG. 1 as support elements composite plates (sandwich plates) consisting of plates 10a of metal and an intermediate layer 10b of for example plastic are shown.

The elements or element groups disposed in the cavity form the inner unit.

It consists of support plates 10, 16, 19 and insulating plates 13 which are connected together in composite manner to form individual units of changeable position. The insulating plates 13 (e.g. honeycomb plates) comprise cells or chambers against the open sides of which flexible foils 12, 18 and compressible plates 11, 17, for example of synthetic foam, may be pressed. To obtain predetermined stress states of the unit, in particular to bend the shells 1 and 2 concavely with respect to each other, at least one reduced pressure, preferably a vacuum, is produced in the cavity and/or its subdivisions (cells, chambers). This vacuum serves at the same time for sound and heat insulation by preventing sound irradiation and eliminating air convection.

The inner unit is enclosed in gas-tight manner by an encircling sliding layer 9 serving as border in envelope manner. The sliding layer 9 is connected via seals 4 to the inner shell members 1c, 2c. This seals the inner unit in gas-tight manner on all sides. The support elements 10 (left of FIG. 1) and 19 (right of FIG. 1) adjacent the outer shells 1 and 2 form the shells or parts of the shells of the inner unit. At least one shell is of changeable location (in FIG. 1 the right composite shell 19).

Hereinafter the inner unit and its functions will be described in detail:

The plate 10a bearing on the inner surface of the shell member 1c is preferably vapour proof and made for example of metal to prevent any penetration of moisture into the cavity. Between this plate and the plate 1c an adhesive layer may be disposed, for example by means of an adhesive film, or a resilient plastics layer (synthetic foam) or a rubber plate, depending on the requirements, so that the sandwich plate 10a, 10b, 10a forms with the plate 1c a uniform composite plate and the intermediate layer 1d permits the concave bending of the shell 1 to be effected.

The inside 10a facing the cavity of this composite plate is joined to a plate 11 of preferably compressible material, for example a synthetic foam plate, felt plate, rubber plate, asbestos fibre plate, glassfibre-reinforced plate, for example by means of adhesive layers, such as epoxide resin films, in composite manner. At least the surface of the plate 11 exposed to the cavity may be provided with a preferably vapour-proof highly reflective layer 12, for example with an aluminium foil, or with a gas-tight plastics foil (e.g. of polyethylene) with vapour-deposited aluminium or an aluminium sheet. If a synthetic foam plate with for example closed pores is used as plate 11 it is convenient to line the synthetic foam plate 11 as a whole with such an envelope consisting for example of an aluminium foil or sheet closed all round in gas-tight manner. This has the advantage that the infrared radiation from the composite plate 10a or the adjacent envelope surface 12 is emitted only to a minor proportion of about 10–15% in the direction of the plate 11 into said plate 11 (the volume of which is occupied to an extent of about 80–90% by closed pores). This radiation impinges on the free inner surface of the opposite aluminium foil or sheet with which the plate 11 is preferably loosely connected and more than 80% thereof is reflected therefrom. This makes it extremely difficult for the infrared radiation or heat energy to pass through the plate 11.

As FIG. 1 shows, the plate 11 or its aluminium foil 12 is followed by an air gap 14; the latter is followed by a plate 13 comprising cells, chambers or the like which to establish the air gap 14 and a further air gap 15 on the following side comprise compressible inserts 13a in some of the cells (e.g. honeycomb plate). The plates 13 may be of insulating material, for example cardboard or plastic, and be provided for example with vapour-deposited aluminium layers or may be made from highly reflecting metal, for example aluminium strips and sheets.

The form of the cells, chambers, honeycombs, may be adapted to the specific requirements. In particular, the cell plates may have webs or walls extending at right-angles which perform loadbearing functions as support elements. For sound insulation the webs or walls are preferably arranged offset with respect to the intermediate plates 16.

The air gap 15 is followed by a multiple composite group 18, 17, 16, 17, 18 consisting of a centre loadbearing composite support plate 16 for example (metal-plastic, metal-plastic-metal (16a, b, c, d, e) as well as preferably compressible plates 17 disposed on both sides thereof in composite manner, for example as already described with reference to number 11, with layers or envelopes 18 consisting for example also of reflecting aluminium foils. The layers 17 and, if heat insulation is unnecessary at least at this point, the aluminium foils 18 may be omitted.

The cell webs or chamber walls then press directly vertically from both sides onto the metal support plates or onto the composite plate 16 made therefrom. The higher the load resting on the shells and the greater the resulting horizontal pressure component originating from the concavely bent shells 1 and 2, the greater the bending strength and thus the load capacity of the composite plate 16. The result of this interaction is a disproportionately increasing loadability of the composite unit.

The layers 11 may for example be omitted. The composite support plates of the inner unit are then subjected by the cell webs or chamber walls to an equal pressure on both sides and supported and their structural strength correspondingly increased.

Towards the right of FIG. 1 all the parts described then occur again in symmetrical sequence. Towards the inner surface of the plate 2c the support element (10a, 10b, 10a) comprises, as shell of the inner unit, a support plate 19 in composite manner.

The support plate 19 is connected to said support element 10 preferably by a resilient intermediate layer, e.g. of synthetic rubber or resilient plastic. The support plate 19 performs in particular, in addition to its supporting function, as shell the pressing together of the individual support and insulating elements described jointly with the parts 10, 11, 12 connected in composite manner, by changing the position. This is done after evacuating all the cavities, cells, chambers, of the inner composite unit. Preferably, a vacuum is established. For this purpose the upper border comprises in the portion 3c facing the cavity an evacuating tube 32 which with tube sections 32a perpendicular thereto communicates with the cavity. The tube 32 carries externally a valve 33 which prevents the air flowing back. A vacuum pump is associated with the valve.

The gaps 14 and 15 communicate with the mouths of the tube sections 32a. Via these gaps the cells and chambers of the vertical cell plates (honeycomb plates) and chamber plates 13 may be completely evacuated.

FIG. 1 shows above the inner support elements a sliding layer 9 which is provided round the inner surfaces of the border 3c. The elements inserted may be vertically displaced at said sliding layers 9 and moved and pressed with respect to each other. It may be advantageous to provide a further preferably solid sliding element 20a, which distributes the load or compressive forces, between the for example centre support elements and cell plates (honeycomb plates) for movement all round. These support the edges of the elements introduced in surface-contact manner. These additional sliding means 20a may for example be of wood and plastics material with very smooth upper and lower surfaces. The enclosing slide layer 9 can be combined with the inside of the border 3c in composite manner with materials particularly suitable for sound and heat insulation, e.g. plastics. The intermediate sliding elements 20a have beneath the tube openings 32a air slots 20b of a length such that in spite of the movement which the individual members execute when pressed together the connection to the evacuating tube and the evacuating apparatus is retained. The slots 20b pass through the slide element 20a from the top to the bottom and only a few slots need be provided. Simultaneously with the evacuation of the cavity, the gap 35 between the shells 19 and 2c can also be evacuated by a corresponding further evacuating tube 37 and valve 38.

After the evacuation via the tube sections 32a and the gaps 14 and 15 has been completed, the air is let into the gap 35 again via a cock 39. The composite plate 19, 10, 11, 12 is thus moved against the elements 13, 18, 17, 16, 12, 11, 10. These are pressed into each other under tension with their compressible parts. The inserts 13a are pressed into their respective cells completely up to the plane of the cell plates 13. The aluminium foils 12 and 18 and the compessible layers 17 bearing thereon and consisting for example of closed-pore synthetic foams move forwards convexly into the open sides of the cells 13 and close the latter individually in gas-tight manner. This convex penetration of the layers 12 and 18 jointly with the layers 11 and 17 into the individual cells of the cell plates 13 provides a high-shearing strength and produces an overall composite core of the inner cell whose parts are all fixedly connected to each other. Each individual cell of chamber represents due to its highly reflecting walls an all round mirror chamber in which the infrared radiation is reflected to and fro and only a very small fraction thereof is passed on to adjacent layers.

The plates 13 with their cell webs or chambers support by means of the high pressure which is concentrated on them the composite plates 10a and 16, for example via the layers 11 and 17, in a manner resistant to bending. Because of the evacuation of the cavity the latter layers are under the pressure of the outer plates 1 and 2 on which acts the atmospheric pressure with 10 t per m$^2$. If the webs or cell walls contact only 1% of the area, calculation for a web contact of 1 m$^2$ gives a counterforce exerted by the webs of 100 kg per cm$^2$ or 1000 t per m$^2$ web contact. The compression of the support elements and cell plates 13 may for example be effected by screws 40 which are disposed in air-tight manner through the composite plate 2 perpendicularly to the plate 19, threads and counterthreads being provided in the plate and/or a nut 41. This permits the application of pressure against the support elements by the screws 40 to be increased as required. The composite plate 19 (inner shell) is preferably covered on the surface adjoining the gap 35 with a metal plate 19b which distributes the pressure exerted by the screws 40. The passages of the screws 40 are provided with seals 42 for sealing the screws 40 with respect to the remaining part of the gap 35.

An excess pressure may be produced in the gap 35 and facilitates the tightening of the screw 40 which press with their blunt ends loosely against the metal surface 19b of the pressure plate 19. The excess pressure remain restricted to the gap 35 sealed all round by encircling edge seals 36. To maintain the exact pressure for unlimited time, instead of air or gas the pressure may be produced by a liquid or pasty filler which solidifies subsequently without shrinkage. The composite plate 19 consists advantageously of compression-resistant insulating material and may be reinforced.

The inner unit in the cavity may be made symmetrically. For this purpose, the parts illustrated on the right in FIG. 1, i.e. the shell 19, are to be arranged with formation of a gap 35 sealed by seals 36 and provision of screws 40 and associated seals 42 as well as the evacuating tube 38a with valve 38 and cock 39 in the same manner. The pressure on the support elements 10 and 16 disposed symmetrically in the inner unit is applied from both sides in identical manner. This pressure is exerted by the screws 40 and must be taken up by the shells 1 and 2 as counterpressure. The plates 1 and 2 must therefore have a high flexural strength, being for example of reinforced concrete of corresponding thickness and strength.

To prevent a convex outward bending of the shells 1 and 2 additional stress screws may be arranged through recesses across the unit from the one shell 1a to the other shell 2a. These stress screws can initially impart a concave bending inwardly to the two shells 1a and 2a maintain said concave form. By means of the screws 40 a correspondingly high pressure may then be exerted on the shells of the inner unit, either from only one side as illustrated in FIG. 1 or from both sides with a symmetrical arrangement.

As modification FIG. 1 additionally shows a specially constructed screw 51 which is mounted with its fixed nut 51a on the plate 1a and is disposed gas-tight with the screw head 51b against the moveable plate 19 of the inner unit.

To enable the screw 51 to be actuated a tube 52 is introduced displaceably in gas-tight manner through the outer shell 2 and a screwing device can be inserted through said tube, said device engaging for example in the slot of the screwhead 51b and turning the screw 51 into the fixed nut 51a. With its end the tube 52 engages the screwhead 51b loosely and slides in airtight manner with the movement thereof into the cavity or the widening gap 35 until the final position of the screw 51 and thus of the screwhead 51b has been reached. The outer shell 1a is thus connected to the inner unit via the opposing shell 19 thereof to form a unit, providing the connection and stressing the support plates and insulating elements.

To bring the shell 1 with the shell 2 into a stressed convexly opposite position with the shell 2a the tube 52 comprises on its outside a thread for receiving a nut 53. When the end position of the screw 51 has been reached said nut is turned against the shell 2a until the latter comprises advantageously a concave bending.

Since this pressure of the nut 53 is transmitted as tension to the shell 1a via the nuthead 51a of the screw 51, both shells 1 and 2 are directed towards each other in the same manner with the same tension.

The screws 51, 51a, 51b, 52, 53 may be disposed in any number at points of the shell surfaces which are of particular significance statically as regards the flexural strength. All parts of the screws and the tube 52 are led in gas-tight manner through the unit and are also sealed in the gap 35 by seals 52a.

The screw 51 may also be disposed in such a manner that the screwhead 51b is stationary, the tube 52 then being stationary as well, and the nut 51a provided for example with a slot which permits it to be turned into the screw 51. In this case, instead of the tube 52 on the stationary screwhead member 51b a further screw may be mounted, for example welded, which receives a nut 53 which permits the application of the shell 2a.

The inner unit may also be independently stressed by a screw 51 if the nut 51a is disposed against the inner shell 10a or 19 with the symmetrical arrangement as described above on the left side of the inner shell. The screw 51 may be extended outwardly and a second nut 53 may serve for pressing the shell 1 from the outside.

The pressing of the shell 19 widens the gap 35. To transmit the pressure force of the nut 53 to the inner unit suitably dimensioned and for example insulating spaces may be provided in particular at the points of greatest concave bending of the shell surfaces in the gap 35 and limit in predetermined manner the concave bending inwardly without the pressure being transferred to inner support elements or an inner unit. These serve in this case only as sound and heat insulation. Such fixing spacers may also be provided in conjunction with the screw parts passing through the gap 35 in such a manner that said screw parts 52 pass through the spacers 52a. The form of these spacers may be optimized as regards the further purposes which they are to fulfil, for example for forming acoustic nodes or node lines on the shell surfaces (the outer and/or also the inner shells and the support elements 10,16). The material of said spacers may also be heat-insulating and heat bridges correspondingly reduced by suitable configuration, for example in the form of a truncated cone whose truncated tip is directly outwardly.

Instead of leading the evacuating tube via the border 3c to the gaps 14 and 15 this may be done by passing the evacuating tube transversely through the inner unit through recesses in the support and insulating elements, a suitably long slot (not shown) being provided at least in the region of the cells to be evacuated and their displacement. Due to this slot it is always possible to extract the air in any position of the displaceable supporting and insulating elements in the inner wall unit. This tube is led through the shell 1 or 2, the associated gap 35 and the inner shell 19 and sealed all round in gas-tight manner. On the outside it carries a valve and is connected to a vacuum pump (cf. tube 32).

The moveable intermediate piece 20*a* may be omitted. For insulating reasons the screws may be of plastic.

FIG. 2 shows an embodiment comprising the shells 101, 102, 103, 102 and 105. The shells are multiple composite shells which may consist for example of sheet metals, plastics layers, plastics adhesive films, plastics foils, solid plastics plates, reflecting foils or other materials of an inorganic nature, for example cement plates, concrete plates. The choice of the materials depends on the intended use of the unit.

In the present example of embodiment of FIG. 2 the left outer shell consists of a preferably reinforced concrete plate 101*a* which is joined in composite manner to a sheet metal shell 101*c* whose edge portions are bent in U-shaped manner by a resilient plastics layer 101*b*, for example by a resilient adhesive layer. Towards the interior of the unit these composite parts may be provided with further coatings. Thus, for example, a rubber plate 101*d* may be applied to the metal plate 101*c* and said rubber plate followed by a further metal plate 101*e*. This combination of the outer shell 101 has the advantage that the concrete plate 101*a* provides a protection of the unit from damage from the outside. The resilient intermediate layers 101*b* and 101*d* can take up stresses which occur on evacuation of the unit without endangering the bonding. The resilient plastics layer 101*b* may for example be formed by an adhesive film with strong binding forces to the metal surface and the concrete surface with suitably high inherent cohesive ply adhesion forces of the adhesive plastic. The rubber layer 101*d* between the metal layers 101*c* and 101*e* is also intended to resiliently take up stresses although in the manner peculiar to the rubber.

The metal sheet 101*e* forms the inner wall of a cavity 121 which is bordered on the other side by a multi-layer shell 102 and is sealed in gas-tight manner all round by an encircling seal 122. Welded to the cavity inside of the metal sheet 101*e* is a screw 123 with its screwhead 123*a* which is led transversely through the unit and all the parts disposed therein.

The screwhead 123*b* thereof is provided at the opposite outer shell 105 so that this latter shell of variable location can be pressed against the support and insulating elements arranged in the overall cavity.

Air hoses 124 are disposed in the cavity 121 and are limited for example by transversely extending insulating strips 125 through which the screws 123 are led in gas-tight manner. Disposed above such a transverse seal 125 is a further hose 124 to the following transverse seal 125 and screw rod 123 and so on in succession. The air hoses 124 may be coupled together in air-tight manner by tube couplings which are led through the insulations 125. The combined shell 102 is provided with transverse perforations 127 which connect the cavity 121 and the air disposed therein to the further cavity 129 following the shell 102. Arranged in said cavity 129 is a cell plate 128 (honeycomb plate) with cells open laterally and towards the plate 102 and also the following support plate 99 comprising cell webs or cell walls perpendicular thereon. The following support plate 99 is also provided with perforations 127. There then follows a further cell plate 128 and the latter is followed by a composite shell 103 consisting preferably of a plurality of layers to be combined together for different purposes, e.g. tensionable, this resiliently hard metal sheets with interposed resilient plastics composite layers, including for example sound absorbing layers (e.g. copolymer films) in the same or different repeated sequence with identical or other layers to suit the purpose, in particular suitable for making and maintaining a stressed state for unlimited time.

In FIG. 2, this central shell 103 is followed symmetrically by a cell plate 128, a support element 99 and with perforations 127 and a shell 102 (identical for example to the aforementioned shell 102) and then again by a cavity 121 with air hoses 124 as described above which are connected by tubes and consist of gas-tight extensible material, in particular of rubber as suitable or of suitable plastics foils. The following shell 105 may, if a building inner room follows, be constructed specifically in accordance with the purpose and the resulting requirements, for example as regards fire protection, interior gypsum plaster, etc. More especially, refractory materials such as asbestos plates, glassfibre mats, mineral wool inserts, may be provided in an intermediate space which follows towards the gypsum wall and serves for fire protection. To simplify the illustration FIG. 2 shows as room boundary only a gypsum wall 116 which may be arranged as desired with or without intermediate space.

The objective here as well is to establish a vacuum at least in the cell cavities. For this purpose, air-tight tube openings 130 are provided to the individual cavities 121 and are connected via valves (not shown) to a vacuum pump. The cavities may also be connected together by slots in the insulating spaces 125.

The air hoses 124 may also be evacuated by evacuating tubes 132 opening in air-tight manner into said hoses. It suffices to evacuate one of these air hoses because due to the aforementioned tube connections of said hoses with each other this automatically evacuates all the air hoses, which are disposed above each other in the overall cavity 121.

If this evacuation of the hoses 124 is carried out because of the atmospheric pressure obtaining in the cells of the cell plates (honeycomb plates, plates with chambers or the like) air flows into the cavities 121.

The openings 130 of the evacuating tubes 131 provided for the cavity evacuation are thus exposed (see FIG. 2, right-illustration of the squashed air hose 124) and consequently via these tube openings the entire air may be evacuated out of the cell plates following up to the central stress shell 103 completely via the transverse perforations 127. The perforations 127, e.g. punchings, are present in a number and distribution such that in the transverse direction each individual cell has an opening, either to the adjacent cell plate or directly to the cavity 121.

The cavity inside of the shell 102 is provided with an adhesive layer 133. The opposite outsides of the air hoses 124 may also be provided with such an adhesive layer. After completion of evacuation of the cells, via the evacuating tubes 132 opening into the air hoses the air or a gas (e.g. nitrogen) is introduced into the air hoses 124 at atmospheric pressure or an excess pressure. The outsides of the air hoses opposite the perforated shells 102 press against the latter and stick together mutually in gas-tight manner. Thus, in conjunction with the usual sealing means the vacuum established in the cells is reliably ensured for a limited time. As illustrated, the cell plates are in connection on both sides of the support element 99 via transverse perforations 127. These transverse connections need not be closed. In case of damage onto two of such adjacent cell cavities would be affected because there is not vertical connection of the cells to each other.

The air hoses may be connected inwardly or outwardly with the part serving for the adhesive closure of the transverse perforations 127 to flexible or fixed plates which carry out the adhesion of the transverse perforations when the excess pressure is admitted.

Due to the excess pressure in the cavities 121 on the one hand and the vacuum in the celled cavities following the shells 102 on the other, the shells 103 are bent concavely towards each other. The position due to this concave bending with respect to the U-shaped edge angled portions produces a stress which makes said angled portions tend to spread outwardly. They are prevented from doing this by the shell 103 which is also fixedly connected to the screws 111 led transversely through the angled portions. The shell 103 is thus in a state of tensile stress all round. To enable the stress resulting from the concave building to be transmitted as completely as possible to the edge angle portions 102a, b, c, corner reinforcements e.g. triangles 137, are provided.

The greater such a unit is loaded in particular on its concave shells 102 the greater the central shell 103 is stressed by tension of the shell edges 102a, b, c. This state of stress is also of great significance as regards the sound insulation if the cell plates transmit resiliently acoustic vibrations to the shell 103. These have the property of sound-proof walls due to the selective resonance of the stress and the formation of acoustic nodal lines through the webs and chamber walls. Their natural frequency may lie outside human perception.

The concave bending is also secured at the same time by the aforementioned stress screws 123 and the insulatng strips 125 which are connected to the nut 123 and fix the spacing.

In addition, according to the invention the stress of the shell 103 and the resulting increased concave bending of the shells 102 is effected by additional stressing means. This is done according to the invention as follows:

All round the shell 103 on both sides of the surfaces thereof screw bushes 140 having an inner thread are welded on, and into said bushes screws 141 may be screwed which on tightening press against a rigid plate 142 resistant to bending. This plate comprises openings through which the shell 103 projects with portions remaining after corresponding punchings. The said screw bushes 140 are mounted on said projecting portions of the plate 103. The compression-resistant plate 142 is moveably disposed on the shell 103. It is fixedly connected to the U-shaped edge angled portions 102a, b, c of the shells 102 by connecting pieces 143 welded therebetween. Solid pressure strips 144 resistant to bending are disposed in the direction of the planes of the shells 102. By the tightening of the screws 141 the plates 142 are pressed towards each other at the opposite ends of the unit and the lever-like edge angled portions 102a, b, c arranged with the parts 102c on the strips 144 in the manner of two-armed levers, are caused to stress the edge angled portions 102a outwardly by bending. This further increases the force in the direction of the concave bending of the shells 102. In turn these shells exert a correspondingly higher pressure on the cells 128 or their cell webs with which the plates 99 and 103 are supported from both sides. The supporting in bending-resistant manner is thus enhanced. In addition, tightening of the screws 141 increases the stress of the shell 103 and thus opposes any buckling. It is thus possible in the manner explained to increase the stress state of the unit substantially in predeterminable manner as required, depending on the purpose, not only by the difference in pressure between the vacuum in the cavity and the cells and the excess pressure in the air hoses and not only by the stress screws 123 but additionally also via the aforementioned pressure actions on the U-shaped bent edged portions 102a, b, c of the shells 102 and on the pressure strips 144.

The perpendicular pressure exerted on the pressure strips 144 also increases the already present concave bending or counter-stress against the horizontal load component acting in this direction. Simultaneously, as described the stress state of the shell 103 which is of acoustic significance is also increased.

The stressing of the shell 103 and of the edge portions 102a, b, c of the shells 102 may be effected all round. This also supports on both sides the highly loadbearing support plates 99. The latter are enclosed between compression-resistant insulating edge strips 150 on all sides in gas-tight manner.

For heat insulation, highly reflecting foils 77 or metal sheets 77 may be associated with all free spaces or cells and chambers. Also, depending on the purpose, preferably compressible intermediate plates may be associated with the cells, chambers and the like.

The parts 102b of the U-shaped edge angled portions 102a, b, c of the shells 102 are fixedly connected together by screws 111 and interposed seals 110.

All the screws 123 and any other parts to be provided are sealed in gas-tight manner with respect to the cavities through which they pass by means of seals 151 preferably of combined materials of different elasticity. The shell 105 is arranged separate from the shell 102 between cover plates 152 in gas-tight manner by means of seals 153 which may also serve as spacers and is held by the screws 123 and by additional screws welded to the perpendicular edge portions of the shells 102 by the bolt welding method (not shown, cf. the nut 123a).

Above the angled portions 102a as well and, if non-angled flat plates are used, insulating seals 150 may be provided. These seals may also be compression-resistant spacer strips or comprise such strips in combined manner, by which the spacing of the opposing edge portions of the shells 102 is restricted to an intended minimum. In contrast, the seals 110 provided between the edge portions 102 are preferably highly resilient, e.g. elastomeric. The screws 123 can produce a concave bending without changing the minimum distance corresponding to the compression-resistant spacers 150. These pressure-resistant sealing strips 150 press the shells 103 on both sides in gas-tight manner.

The screws (e.g. 123) may also be led through said seals 150. For this purpose the dimensions of the seals 150 are to be made suitably large.

The seals 150 run all around and accommodate the support elements 99 in supporting manner, preferably gas-tight sealed all round.

The seals 150 may be combined with resilient material 151a in particular at their edge portions with which they are disposed against the shells without impairing their function as spacers to define a predetermined spacing of the shells 102. The preferably composite seals 153 and 125 also have a spacing function. The spacers 150 are able to relieve the cell plates 128 from the pressure of the shells and thus avoid the formation of acoustic bridges. In particular, such spacers may be provided additionally in conjunction with the screws 123. For this purpose, the support elements 99 and 103 comprise corresponding perforations through which the screws are led in air-tight manner preferably jointly with the spacers between the shells. The resulting larger intermediate spaces which are not supported by the cell plates 125 or are only slightly supported bend in some areas concavely with respect to each other in addition to the overall bending of the shells 102 and thus have an enhanced sound-insulating stress without forming acoustic bridges in the cavity.

The sheet metal shell member 101c united in composite manner with the outer shell 101 may also be angled for example in z-shaped manner and mounted via an additional seal 110 with the common screw 111 which also receives the composite shell 103.

The cavities necessary beneath the shell angled portions 102a for arranging the stress screws 111 and 141 described may also be isolated from each other, for example by filling with plastics foam.

The unit following above or below or on the side may immediately adjoin the facade plate 101a. This facade plate, for example in concrete, may be plastered or faced in conventional manner.

Such concrete walls may be stuck with epoxide resin adhesives which withstand tensile shearing forces of 200 kg (hot adhesive 400 kg) onto the angled sheet metal shells with no danger of subsequent detachment. However, bolts or angle strips or the like, for example, may be additionally welded to the sheet surfaces and engage in corresponding recesses of the concrete plate and thus form a supporting base for the supporting adhesive force.

The use of such plastics adhesive is, as described above, advantageous with all sheet-like parts which are to be joined to form a composite unit. However, the cell wall (for example honeycomb webs) and chamber walls may also be joined with such adhesives in a manner resistant to shearing and thrust to the cover plates covering them, e.g. metal sheets, for example in sandwich manner.

With a plastered facade and within the rooms with a gypsum plaster or a gypsum wall, a unit made in this manner cannot be distinguished externally from conventional constructions.

A further modification of the form of such units results from arranging the intermediate shell 103 between the two shells defining the evacuated cavity. Due to the common bonding and stressing by the common edge screws 111 it is possible to limit the concave bending of the two shells. The intermediate shell 103 is stressed by the concave bending until its degree of stress compensates the tensile forces acting thereon, i.e. until force equilibrium is established between the horizontally acting buckling component and the counter-force of the intermediate shell 103 opposing said component.

The intermediate shell 103 takes up the compressive forces of the atmosphere by which it is stressed via the shell edge angled portions and the horizontal component of the load in such a manner that a further concave bending cannot take place because of its high counterstress.

This state of stress may be regulated by the biassing arrangement of the stress screws 141 in such a manner that the concave bending of the shells defining the evacuated cavity is minimised. This means that the horizontal component on subjecting the unit to a load may be kept very small and thus the flexural strength is ensured even at extremely high loads. The cell plates provided in the cavity and other means may be arranged loosely without themselves taking up a pressure, which is of great significance for sound-insulating by eliminating sound bridges, and at the same time provide a safety factor should unusual circumstances cause the evacuated cavity to develop a leak.

Figure 2A:
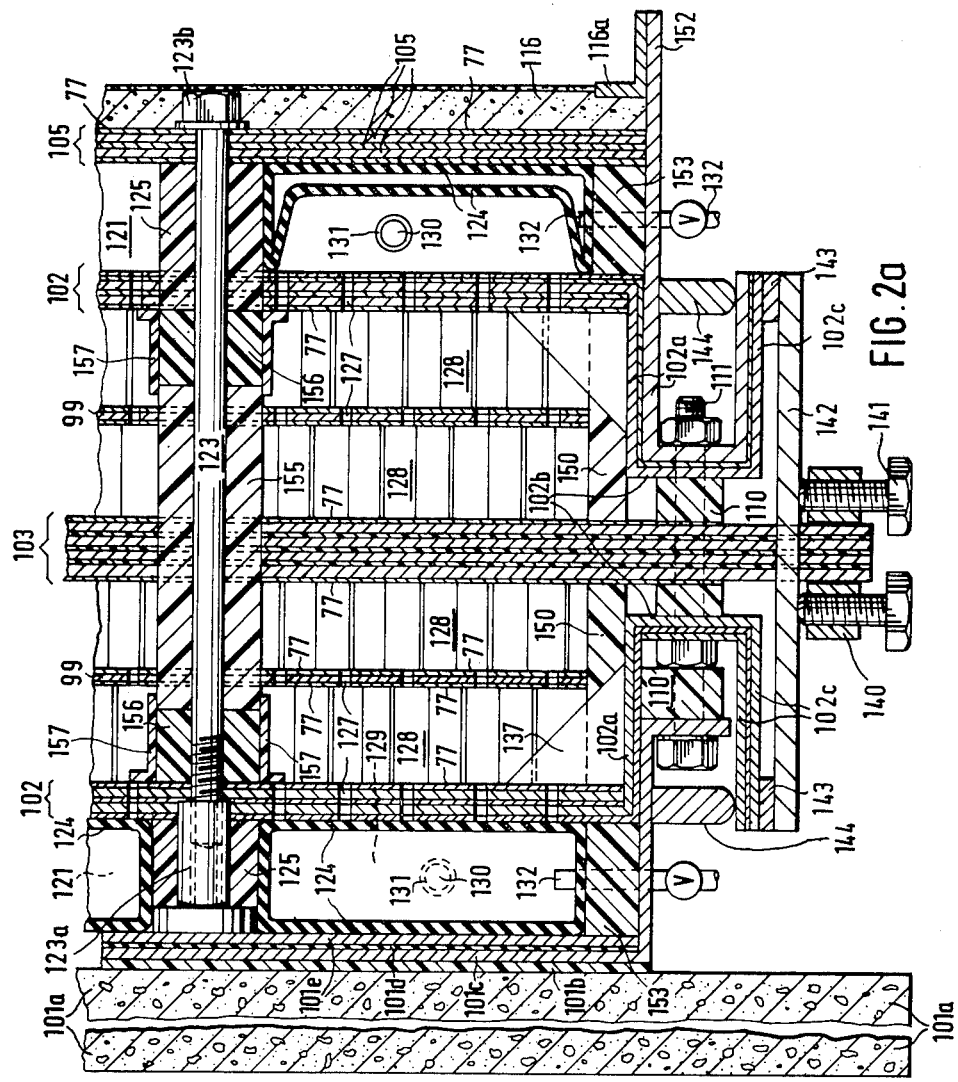

FIG. 2a shows a modification of FIG. 2. The U-shaped angled portions of the two shells 102 are shortened so that they only extend up to over the solid bending-resistant pressure strips 144 and lie on the latter. On tightening the stress screws 141 the pressure which the latter exert via the bending-resistant pressure plate 142 is transmitted from the interwelded solid strips 143 directly onto the perpendicular pressure strips 144.

If the shells 102 have already been provisionally concavely bent, either this bending or the inner stress in the concave direction is intensified and at the same time the intermediate shell 103 is subjected to increased tensile stress in all directions by the stress screws 141. Thus, a high natural frequency of the intermediate shell 103 may be produced to give a selective resonance.

Instead of the direct pressure in the direction of the planes of the shells 102 via the compression-resistant strips 144, the pressure can be exerted by omitting the U-leg 102c by the shortened pressure plate 142 onto the edge angled portions 102b. In this case, an outward stress (convex) may be imparted to the shells 102. Since however the screws 123 secure the concave position of the shells with respect to each other no convex bulging occurs. In addition, a corresponding counterforce can be established by the excess pressure in the cavities 121. This makes it possible to regulate the position of the shells 102 selectively so that in spite of the concave and/or convex forces if desired a strictly perpendicular position of the shells 102 results from the equilibrium of forces. The significance of this possibility of regulating the position of the shells resides in that the horizontal buckling component can be almost completely eliminated and consequently only slight forces are necessary to prevent a buckling or bulging and to reinforce the shells so that they are resistant to bending.

The spacers associated with the screws 123 may be made in various manner. They preferably consist for example of at least one main part 155, for example of circular or rectangular form, which accommodates in its interior the screw 123 and at its ends comprises softer and more resilient material 156. To prevent this softer material from yielding laterally under the high pressures which are exerted by the screws, in angular, tubular or rectangular manner a border 157 for receiving said sealing material 156 is placed on the shells 102 of hard bending-resistant material which is fixedly connected to the shells 102 and displaceable onto the major part 155 of the spacer. This achieves firstly a complete sealing and secondly ensures a predeterminable minimum space. Provided in the cavities 121 following the shells 102 are further more especially composite spacing means 125. This makes it possible to tighten the screws 123 up to a predetermined spacing and to impart to the shells the statically necessary stress in particular without pressure acting on the shell plates.

On both sides of the shells 1a and 2a (FIG. 1) and 101a and 105 (FIG. 2) further cavities and additional shells may be provided for example for fire protection. Thus, for example, facing the inside of a building following the shell at this point an intermediate space may be formed with the inner wall of the room which is filled in gas-tight manner for example with nitrogen or carbon dioxide and/or asbestos plates provided for example with perforations (as cells) and the asbestos plates may be coated on one or both sides with high-gloss sheet metal which in the case of fire prevents the thermal radiation from penetrating to the inner shells. The sheet metal surface facing the cavity may for example be cooled with water and thus cool the back of the reflecting side facing the fire. In this additional cavity a water tank or water pipes may be disposed and the cavity may be sealed in water-tight manner from the unit by metal sheets secured thereon.

In addition, thermostatically operated discharge nozzles may be provided in particular at the upper edge of the divided cavity and at a certain temperature in the case of fire said nozzles open and discharge water also against for example a porous inner wall disposed at vertical asbestos strips. Due to the porosity of this shell the water penetrates to the inner surface of the room and performs a cooling function. This shell forming the interior wall may also be provided with perforations or nozzles which are concealed and which open thermostatically in case of fire. The water may form a curtain and protect the room wall and/or be sprayed into the room. To extinguish dangerous plastics fires which produce toxic gases chemicals which convert the toxic gases chemically may be added to extinguishing water. Furthermore, tanks containing chemical substances may be provided through which water flows when there is a fire, thus producing a chemical reaction for developing carbondioxide. Thus, the tank may obtain calcium carbonate and in addition hydrochloric acid may be present in for example plastics vessels which under the heat of the fire open at predetermined temperatures and discharge carbon dioxide gas into the fire area resulting from the reaction with the calcium carbonate dissolved in the water, also forming calcium carbonate which remains behind. For this purpose, concealed perforations may be provided in the room walls in the manner employed for the water discharge.

Such extinguishing devices may also be disposed within suspended ceilings and so exert an area effect on the entire room to extinguish the fire.

Refractory glass fibres and mineral wool fibres which take up the water between their fibres may be introduced into the intermediate spaces between the cooling coils which form by metal sheets water-tight tanks with respect to the unit which are sealed from the inside of the building by a porous wall. The water rapidly collects in such water-tight fire protection cavities and thus dampens the interior room walls from their back, thus protecting the inside of the unit from destruction.

It is pointed out in addition that it is possible to prestress not only one intermediate shell as in the example of embodiment of FIG. 2, for example the shell 103, but that tensile stresses may also be applied to encircling borders of such units (bridges, the bridge top and the parallel extending bridge bottom there beneath) between which the perpendicular support elements are arranged according to the principles explained herein, for example by means of stress screws, thus providing a high stress and greatly increasing the loadbearing capacity and resistance to bending.

The unit may be assembled in a works as prefabricated element and then need only be positioned and secured on the site.

I claim:
1. A load-bearing construction unit comprising
   a. outer composite shell assemblies of high flexural strength forming the sides of said unit, border assemblies comprising the top and bottom of said unit, said shell and border assemblies defining a cavity therewithin,
   b. composite supporting plates positioned within said outer shell assemblies,
   c. an intermediate load-bearing composite group disposed in said cavity between and spaced from said outer shell assemblies,
   d. cellular web assemblies disposed between said intermediate composite group and said composite supporting plates, the lateral edges of said web assemblies being tightly and compressively engaged by said intermediate composite group and said composite supporting plates thereby to seal off the individual cells in said web assemblies, whereby the desired pressure conditions can be maintained in said web assemblies,
   e. first screw means extending through said unit for stressing said outer shell assemblies, and
   f. second screw means applying compressive pressure to the remaining elements within said cavity.

2. The construction unit of claim 1 wherein said cellular web assemblies are formed with inserts at either side thereof which serve to initially space said composite supporting plates from said intermediate load-bearing composite group so as to permit said evacuation or pressurization during the formation of the structural assembly, said inserts being compressed during such formation.

3. The construction unit of claim 1 further including means to evacuate or pressurize the interior of said unit during formation thereof, and an inner shell plate disposed between one of said composite supporting plates and the associated outer shell assembly, said second screw means engaging said inner shell plate.

4. The construction unit of claim 1 wherein a metal foil is provided on the inner surface of each of said outer shell assemblies, and said intermediate load-bearing composite group comprises metal sheets and plastic layers assembled in composite form, with a metal foil being integrally provided at each side of said composite group.

5. The construction unit of claim 1 wherein said first screw means comprises a nut head mounted in one of said outer shell assemblies, a screw member extending through said unit there-endedly received in said nut head, and means exposed at the exterior of said unit for tightening said screw member in said nut head thereby to draw said elements within said cavity toward said one outer shell.

6. The construction unit of claim 5 wherein said means for tightening said screw comprises a tube positioned around the head of said member, said tube being received within a recess therefor formed in said inner shell plate.

7. The construction unit of claim 3 wherein said inner shell plate includes a rigid outer surface against which said second screw means engage for uniformly distributing the compressive pressure to the remaining elements within the cavity, a gap being provided between said inner shell plate and the associated outer shell assembly.

8. The construction unit of claim 1 wherein supporting plates include plates of compressible material on the inner portion thereof, said compressible plate engaging said cellular web assemblies during formation of said unit.

9. The construction unit of claim 1 further including a sliding plate located on the interior surface of each border assembly and an additional sliding element disposed above and below said intermediate load-bearing composite group and said cellular web assemblies for facilitating lateral movement of the same within the cavity during compression thereof.

10. A load-bearing construction unit comprising
  a. an outer shell of reinforced concrete and an opposite outer shell defining the boundary of a room or the like, said shells being spaced to define a cavity therebetween,
  b. perforated shell members spaced within and from said outer shells,
  c. a central shell positioned within said cavity in spaced relation from said perforated shell member,
  d. cellular web assemblies positioned between said perforated shell members and said central shell,
  e. inflatable hose means positioned between said outer shells and said perforated shells and adapted to expand so as to provide pressure contact of said perforated shells with said cellular web assemblies, and
  f. means to evacuate a substantial part of the space between said outer shells and said perforated shells for providing a predetermined air condition within said cavity, and additional means to first evacuate and then pressurize said inflatable hose means, with such pressurization acting through said perforated shells and said cellular web assemblies to place said cellular web assemblies to place said central shell under compressive stress.

11. The construction unit of claim 10 further including support plates interposed between the cellular web assemblies on each side of said central shell, said support plates being perforated for evacuation of air from said web assemblies.

12. The construction unit of claim 10 further including screw means extending through said unit for applying additional inwardly directed pressure to the elements within said cavity.

13. The construction unit of claim 12 further including spacing and sealing means positioned around said screw means for sealing the same while passing through the several members within the cavity, and for providing a predetermined minimum spacing so as to effect the desired tightening of said screw means and consequent pressure on said central shell.

14. The construction unit of claim 10 wherein said perforated shells are provided with generally U-shape extensions at the bottoms thereof, and means for applying pressure to the bottom most parts of said U-shape extensions for increasing the tensile stress in said central shell.

15. The construction unit of claim 14 wherein said means for applying pressure comprises a rigid plate, stress screws engaging said plate, and solid pressure strips in direct engagement with a lower leg portion of said extensions.

16. The construction unit of claim 15 wherein said stress screws are received in threaded openings formed in a bushing rigidly secured to the lower end of said central shell, said rigid plate being disposed above said bushing and slidably movable on said central shell, said rigid plate, when moved by said stress screws, engaging bottom, laterally extending sections of said extensions for further increasing the concave bending of said perforated shell member, thereby increasing the tensile stress in said central shell through said cellular web assemblies.

17. The construction unit of claim 16 further including screw means extending through said unit for applying additional inwardly directed pressure to the elements within said cavity.

* * * * *